US007272623B2

(12) United States Patent
Cornea-Hasegan

(10) Patent No.: US 7,272,623 B2
(45) Date of Patent: Sep. 18, 2007

(54) METHODS AND APPARATUS FOR DETERMINING A FLOATING-POINT EXPONENT ASSOCIATED WITH AN UNDERFLOW CONDITION OR AN OVERFLOW CONDITION

(75) Inventor: Marius A. Cornea-Hasegan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 810 days.

(21) Appl. No.: 10/118,349

(22) Filed: Apr. 8, 2002

(65) Prior Publication Data

US 2003/0191787 A1  Oct. 9, 2003

(51) Int. Cl.
*G06F 7/38* (2006.01)
(52) U.S. Cl. .................................................. 708/498
(58) Field of Classification Search ............... 708/495, 708/498, 525, 530, 552, 553, 458
See application file for complete search history.

(56) References Cited

U.S. PATENT DOCUMENTS

| | | | | |
|---|---|---|---|---|
| 4,647,401 A | * | 3/1987 | Gradeff et al. ............. 516/20 |
| 5,892,697 A | * | 4/1999 | Brakefield .................. 708/496 |
| 6,571,265 B1 | * | 5/2003 | Story ......................... 708/498 |
| 2003/0041081 A1 | * | 2/2003 | Steele ........................ 708/495 |

OTHER PUBLICATIONS

Steve Hollasch, "IEEE Standard 754 Floating Point Numbers", Dec. 4, 2001, http://research.microsoft.com/~hollasch/cgindex/coding/ieeefloat.html.

* cited by examiner

*Primary Examiner*—Chuong D. Ngo
(74) *Attorney, Agent, or Firm*—Haley, Flight & Zimmerman, LLC

(57) ABSTRACT

Methods and apparatus are disclosed for determining a floating-point exponent associated with an underflow condition or an overflow condition. The methods and apparatus determine the 'true' value of a floating-point exponent based on a truncated value of the floating-point exponent passed from a floating-point hardware unit to an exponent determination module when the floating-point hardware unit encounters an underflow condition or an overflow condition. The determined value of the floating-point exponent may then be passed to a floating-point software unit for additional floating-point calculations, if necessary. If the floating-point hardware unit does not encounter an underflow condition or an overflow condition, the floating-point hardware unit and/or the floating-point software unit preferably perform the floating-point operation without the assistance of the exponent determination module.

29 Claims, 3 Drawing Sheets

METHODS AND APPARATUS FOR DETERMINING A FLOATING-POINT EXPONENT ASSOCIATED WITH AN UNDERFLOW CONDITION OR AN OVERFLOW CONDITION

TECHNICAL FIELD

The present invention relates in general to microprocessors, and, in particular, to methods and apparatus for determining a floating-point exponent associated with an underflow condition or an overflow condition.

BACKGROUND

Microprocessors are frequently required to perform mathematical operations using floating-point numbers. Often, a specialized hardware circuit (i.e., a floating-point unit) is included in the microprocessor (or electrically coupled to the microprocessor) to perform these floating-point operations. By using a floating-point unit, floating-point operations may be performed faster than if they were performed in software, and the software execution unit of the microprocessor is free to execute other operations.

However, when floating-point numbers are used in mathematical operations, the result of the operation may be too large or too small to be represented by the floating-point unit. When the result includes an exponent that is too large to be represented by the floating-point unit, an 'overflow' condition occurs. When the result includes an exponent that is too small to be represented by the floating-point unit, an 'underflow' condition occurs. In either case (overflow or underflow), a software routine must be executed to perform the operation if accurate results are required. In particular, the software routine must determine the 'true' exponent associated with the floating-point result.

DETAILED DESCRIPTION OF EXAMPLES

In general, the methods and apparatus described herein determine a floating-point exponent associated with an underflow condition or an overflow condition. When a floating-point hardware unit encounters an underflow condition or an overflow condition, the methods and apparatus determine the 'true' value of the floating-point exponent of the result based on a truncated value of the floating-point exponent passed from the floating-point hardware unit to an exponent determination module. The determined value of the floating-point exponent may then be passed to a floating-point software unit for additional floating-point calculations, if necessary. If the floating-point hardware unit does not encounter an underflow condition or an overflow condition, the floating-point hardware unit and/or the floating-point software unit preferably performs the floating-point operation without the assistance of the exponent determination module.

Figure 1:
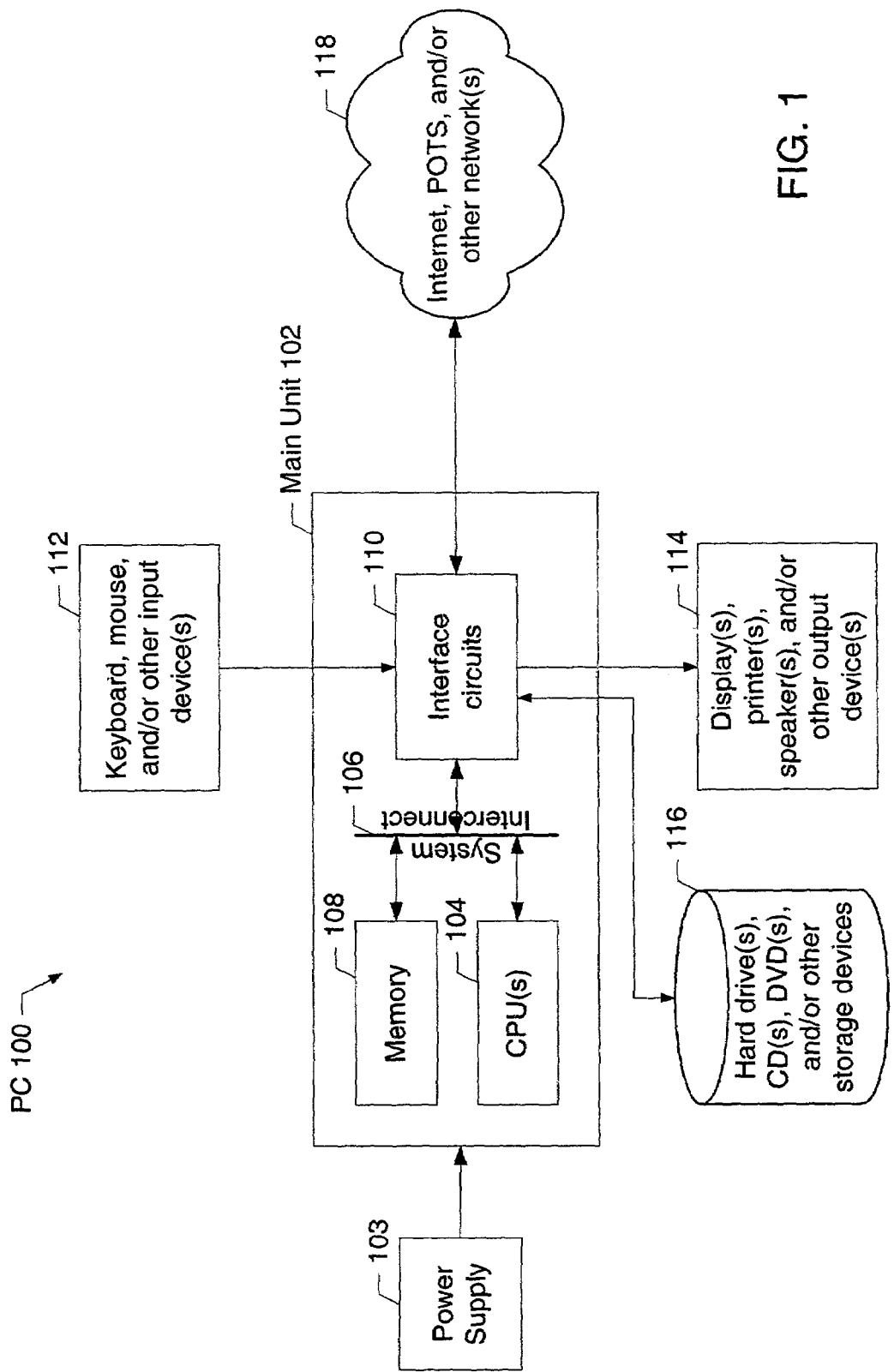
FIG. 1 is a high level block diagram of a computer system illustrating an environment of use for the disclosed methods and apparatus.

A block diagram of a computer system 100 is illustrated in FIG. 1. The computer system 100 may be a personal computer (PC), a personal digital assistant (PDA), an Internet appliance, a cellular telephone, or any other computing device. In this example, the computer system 100 includes a main processing unit 102 powered by a power supply 103. The main processing unit 102 may include one or more central processing units (CPUs) 104 electrically coupled by a system interconnect 106 to one or more memory device(s) 108 and one or more interface circuits 110. In this example, the system interconnect 106 is an address/data bus. Of course, a person of ordinary skill in the art will readily appreciate that interconnects other than busses may be used to connect the CPU(s) 104 to the memory device(s) 108. For example, one or more dedicated lines and/or a crossbar may be used to connect the CPU(s) 104 to the memory device(s) 108.

The CPU(s) 104 may include any type of well known microprocessor, such as a microprocessor from the Intel Pentium™ family of microprocessors, the Intel Itanium™ family of microprocessors, and/or the Intel XScale™ family of processors. The main memory device 108 may include dynamic random access memory (DRAM), but may also include nonvolatile memory. In this example, the memory device(s) 108 store a software program which is executed by one or more of the CPU(s) 104 in a well known manner.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main processing unit 102. For example, an input device 112 may be a keyboard, mouse, touch screen, track pad, track ball, isopoint, and/or a voice recognition system.

One or more displays, printers, speakers, and/or other output devices 114 may also be connected to the main processing unit 102 via one or more of the interface circuits 110. The display 114 may be a cathode ray tube (CRT), a liquid crystal display (LCD), or any other type of display. The display 114 may generate visual indications of data generated during operation of the main processing unit 102. The visual displays may include prompts for human operator input, calculated values, detected data, etc.

The computer system 100 may also include one or more storage devices 116. For example, the computer system 100 may include one or more hard drives, a compact disk (CD) drive, a digital versatile disk drive (DVD), and/or other computer media input/output (I/O) devices.

The computer system 100 may also exchange data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
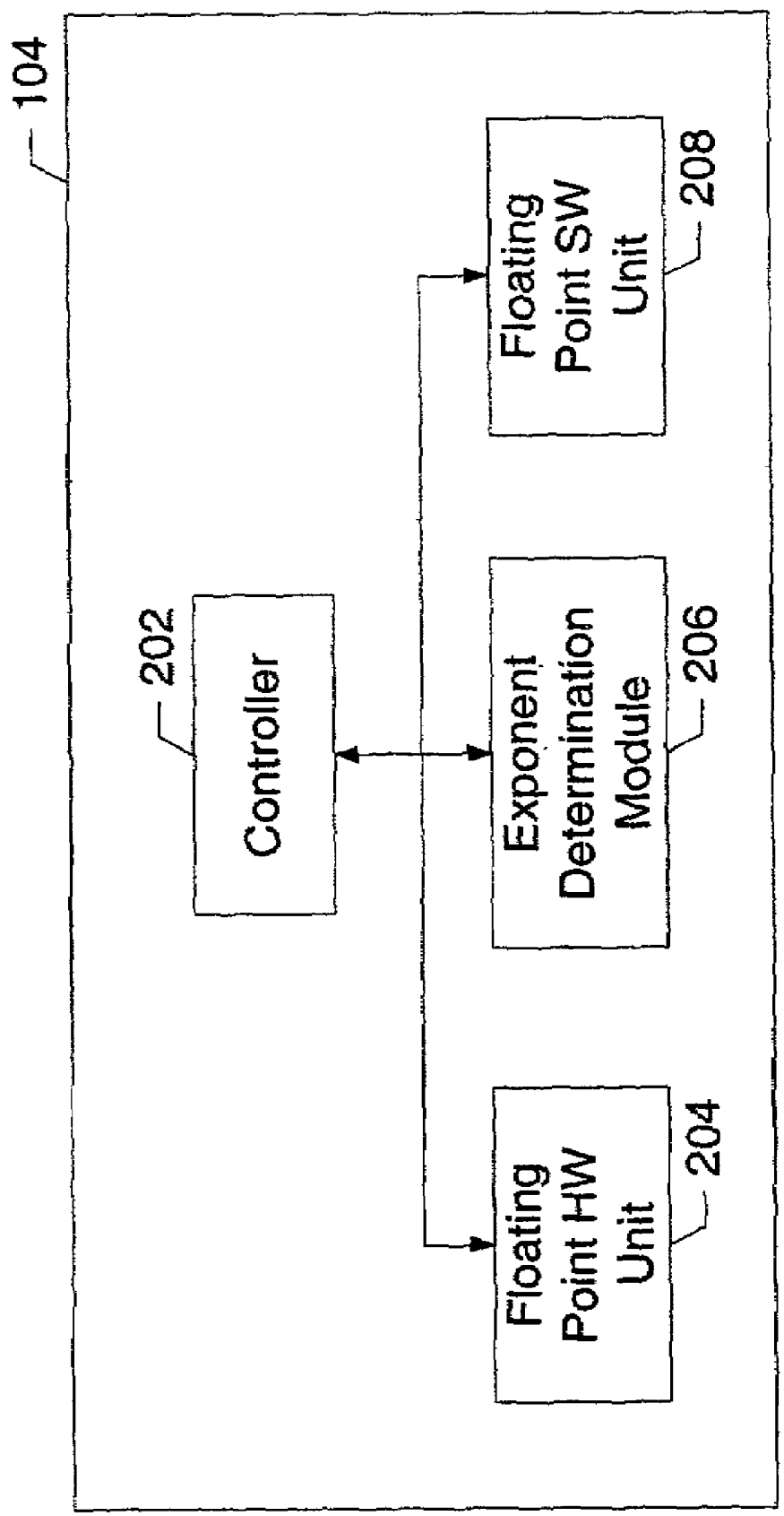
FIG. 2 is a more detailed block diagram of a CPU illustrated in FIG. 1.

A more detailed block diagram of the CPU 104 is illustrated in FIG. 2. Preferably, the CPU 104 includes a controller 202, a floating-point hardware unit 204, an exponent determination module 206, and a floating-point software unit 208. The floating-point hardware unit 204 may be implemented by conventional electronic circuitry in a well known manner. The floating-point software unit 208 may be implemented by a microprocessor executing software instructions in a well known manner. The controller 202 and the exponent determination module 206 may be implemented by a microprocessor executing software instructions and/or conventional electronic circuitry. In addition, a person of ordinary skill in the art will readily appreciate that certain modules may be combined or divided according to customary design constraints. Still further, one or more of these modules 202-208 may be located external to the CPU 104.

For the purpose of controlling the interaction of the floating-point hardware unit 204, the exponent determination module 206, and the floating-point software unit 208, the CPU 104 includes a controller 202. The controller 202 is operatively coupled to the floating-point hardware unit 204, the exponent determination module 206, and the floating-point software unit 208 in a well known manner. For example, one set of software instructions may be operatively coupled to another set of software instructions via a subroutine call, parameter passing, and/or shared memory location(s). In another example, one piece of electronic circuitry may be operatively coupled to another piece of electronic circuitry via electrical signal line(s) such as a bus. In yet another example, a set of software instructions may be operatively coupled to a piece of electronic circuitry via electrical signal line(s) stimulated by a microprocessor executing the software instructions. In one example, the controller 202, the exponent determination module 206, and/or the floating-point software unit 208 are implemented by the CPU 104 executing software instructions.

For the purpose of performing one or more floating-point operations, the CPU 104 includes a floating-point hardware unit 204. The floating-point hardware unit 208 is a well known circuit capable of quickly performing one or more predetermined floating-point operations. However, the range of the floating-point hardware unit 208 is inherently limited by some predetermined number of bits used to represent the floating-point numbers used in the floating-point operations.

Floating-point numbers are represented in scientific notation (e.g., $1.01 \times 2^3$). Accordingly, a floating-point number includes a sign (e.g., positive), a significand (e.g., 1.01), a base (e.g., 2) and an exponent (e.g., 3). In a binary floating-point system, a sign bit of '0' denotes a positive value and a sign bit of '1' denotes a negative value. Typically, a bias is added to the value of each exponent to facilitate a range of positive and negative numbers. For example, a bias of 0xffff may be added to a 17 bit exponent as is well known. In a binary system, a base of 2 is presumed and not stored. In many binary floating-point systems, numbers are stored and/or manipulated in 'normalized' form (i.e., the radix point is located immediately after the first non-zero digit). In such an instance, a leading '1' may be presumed and not stored (e.g., as in IEEE-754).

When floating-point numbers are used in mathematical operations, the result of the operation may be too large or too small to be represented by the floating-point system. When the result is too large to be represented by the floating-point system, an 'overflow' condition occurs. When the result is too small to be represented by the floating-point system, an 'underflow' condition occurs. An overflow condition occurs when the exact result in absolute value is larger than $1.11 \ldots 1 * 2^{\wedge}$ emax. An underflow condition occurs when the exact result in absolute value is smaller than $1.00 \ldots 0 * 2^{\wedge}$ emin.

In order to calculate the 'true' value of the exponent in an overflow or an underflow situation, the CPU 104 includes an exponent determination module 206. In order to facilitate software determination of the 'true' value of the exponent, the illustrated floating-point hardware unit 204 passes a truncated version of the exponent to the exponent determination module 206. In other words, the biased exponent passed from the floating-point hardware unit 204 to the exponent determination module 206 is missing the most significant bit (i.e., truncated) because the floating-point hardware unit 204 is not capable of handling all the bits in the exponent of the floating-point result.

For the purpose of performing one or more floating-point operations, the CPU 104 also includes a floating-point software unit 208. Preferably, the floating-point software unit 208 is capable of handling larger and/or smaller floating-point results than the floating-point hardware unit 204. However, the floating-point software unit 208 is typically slower than the floating-point hardware unit 204.

Figure 3:
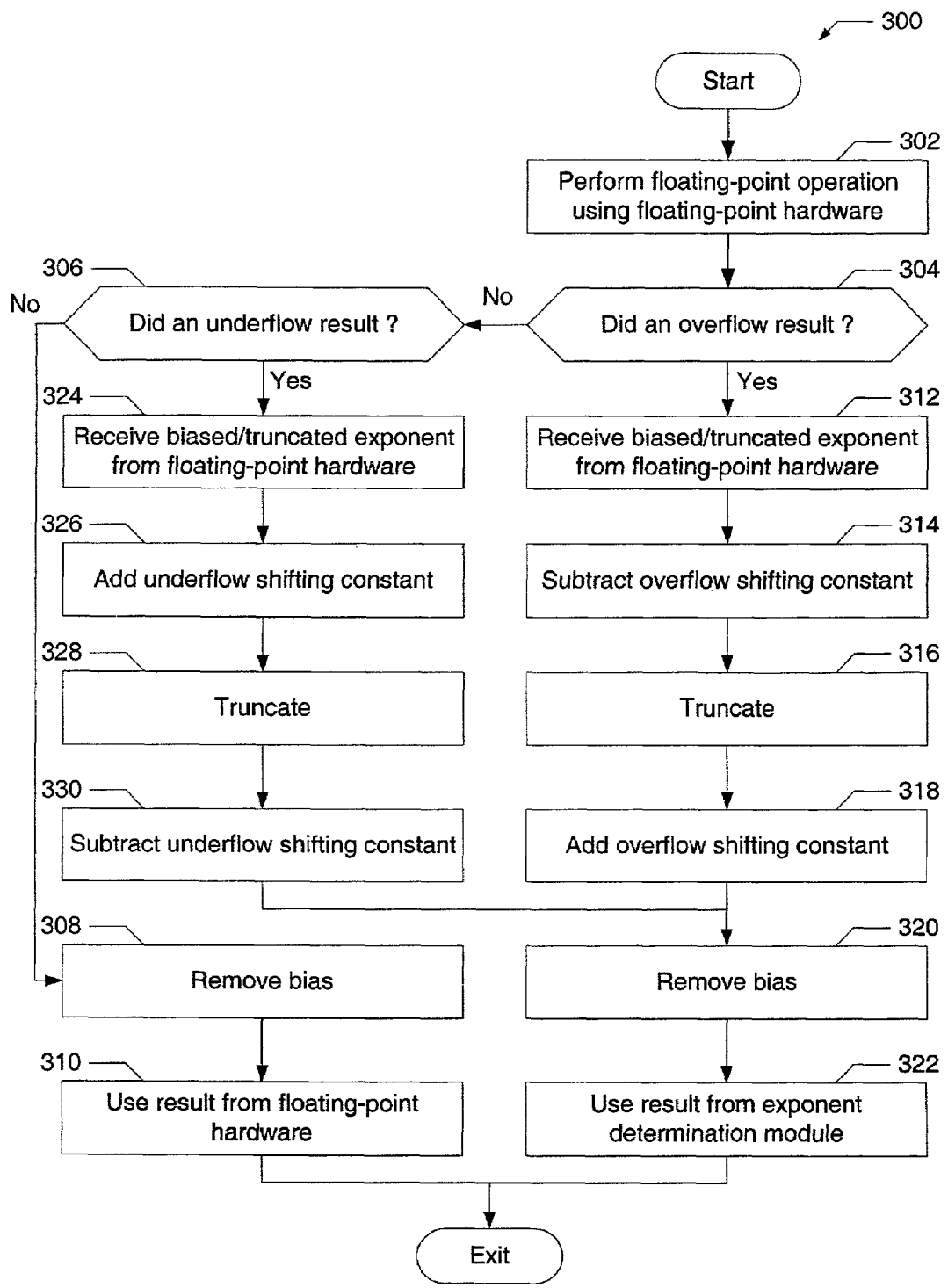
FIG. 3 is a flowchart of a process for determining a 'true' floating-point exponent associated with an underflow condition or an overflow condition.

A flowchart of a process 300 for determining a 'true' floating-point exponent associated with an underflow condition or an overflow condition is illustrated in FIG. 3. Preferably, the process 300 is embodied in a software program which is stored in the memory 108 and executed by the CPU 104 in a well known manner. However, some or all of the components of the process 300 may be performed by another device. Although the process 300 is described with reference to the flowchart illustrated in FIG. 3, a person of ordinary skill in the art will readily appreciate that many other methods of performing the acts associated with process 300 may be used. For example, the order of many of the blocks may be changed, and many of the blocks described are optional.

Generally, the process 300 causes the CPU 104 to determine the 'true' value of a floating-point exponent based on a truncated value of the floating-point exponent passed from the floating-point hardware unit 204 to the exponent determination module 206 when the floating-point hardware unit 204 encounters an underflow condition or an overflow condition. The determined value of the floating-point exponent is then passed to the floating-point software unit 208 for additional floating-point calculations, if necessary. If the floating-point hardware unit 204 does not encounter an underflow condition or an overflow condition, the floating-point hardware unit 204 and/or the floating-point software unit 208 preferably perform the floating-point operation without the assistance of the exponent determination module 206.

In the example illustrated in FIG. 3, the process 300 begins by performing a floating-point operation using the floating-point hardware unit 204 (block 302). The result of the floating-point operation may or may not 'fit' within the number of bits the floating-point hardware unit 204 is structured to handle. Specifically, the exponent of the floating-point result may be too large (i.e., overflow), too small (i.e., underflow), or within the range the floating-point hardware unit 204 is structured to store. Accordingly, the process 300 causes the CPU 104 to test if an overflow condition occurred as a result of the floating-point operation performed by the floating-point hardware unit 204 (block 304). If an overflow condition did not occur, the process 300 causes the CPU 104 to test if an underflow condition occurred as a result of the floating-point operation (block 306). If neither an overflow condition nor an underflow condition occurred, the process 300 optionally causes the CPU 104 to remove the floating-point bias (e.g., for 17 bit exponents subtract 0xffff from the hardware result) (block 308) and use the result of the floating-point hardware unit 204 in any subsequent calculations and/or memory storage operations (block 310).

If an overflow did occur (block 304), the process 300 preferably causes the CPU 104 to receive the biased/truncated exponent from the floating-point hardware unit 204 (block 312). Subsequently, the process 300 preferably causes the CPU 104 to subtract an "overflow shifting constant" from the biased/truncated exponent (block 314). The value of the overflow shifting constant (e.g., for 17 bit exponents 0x1007f) may depend on the number of bits used by the floating-point hardware unit 204 to represent floating-point exponents (e.g., 17) and/or the bias used by the floating-point standard (e.g., for 17 bit exponents 0x0ffff). Specifically, the value of the overflow shifting constant is selected to shift the range of the true biased exponent to make that range start at 0x0.

After the biased/truncated exponent is shifted by the overflow shifting constant, the shifted value is preferably truncated to the same number of bits used by the floating-point hardware unit 204 to represent floating-point exponents (e.g., 17 bits) (block 316). For example, the value may be logically-ANDed with a mask containing 1s in the least significant N bits and 0s in the remaining bits (e.g., for 17 bit exponents 0x1ffff), where N is equal to the number of bits used by the floating-point hardware unit 204 to represent floating-point exponents (e.g., 17). Alternatively, a mod 2^N operation may be performed on the shifted value to truncate the value to the least significant N bits.

Subsequently, the process 300 preferably causes the CPU 104 to add the overflow shifting constant back into the current value of the calculation (block 318). Again, the value of the overflow shifting constant (e.g., for 17 bit exponents 0x1007f) may depend on the number of bits used by the floating-point hardware unit 204 to represent floating-point exponents (e.g., 17) and/or the bias used by the floating-point standard (e.g., for 17 bit exponents 0x0ffff). In addition, the process 300 causes the CPU 104 to remove the bias (e.g., for 17 bit exponents subtract 0x0ffff) (block 320). Finally, the CPU 104 may use the corrected result in subsequent calculations (block 322). For example, the floating-point value with the 'true' exponent may be used by the floating-point software unit 208 in additional floating-point calculations, and/or the value may be scaled down based on the computational model being used (e.g., IEEE Standard for Binary Floating-Point Arithmetic—ANSI/IEEE Standard 754-1985 single precision, double precision, etc.).

If an underflow condition occurs (block 306), the process 300 preferably causes the CPU 104 to receive the biased/truncated exponent from the floating-point hardware unit 204 (block 324). Subsequently, the process 300 preferably causes the CPU 104 to add an "underflow shifting constant" to the biased/truncated exponent (block 326). The value of the underflow shifting constant (e.g., for 17 bit exponents 0x1007b) may depend on the number of bits used by the floating-point hardware unit 204 to represent floating-point exponents (e.g., 17) and/or the bias used by the floating-point standard (e.g., for 17 bit exponents 0x0ffff). Specifically, the value of the underflow shifting constant is selected to shift the range of the true biased exponent to make that range start at 0x0.

After the biased/truncated exponent is shifted by the underflow shifting constant, the shifted value is preferably truncated to the same number of bits used by the floating-point hardware unit 204 to represent floating-point exponents (e.g., 17 bits) (block 328). For example, the value may be logically-ANDed with a mask containing 1s in the least significant N bits and 0s in the remaining bits (e.g., for 17 bit exponents 0x1ffff), where N is equal to the number of bits used by the floating-point hardware unit 204 to represent floating-point exponents (e.g., 17). Alternatively, a mod 2^N operation may be performed on the shifted value to truncate the value to the least significant N bits.

Subsequently, the process 300 preferably causes the CPU 104 to subtract the underflow shifting constant back out of the current value of the calculation (block 330). Again, the value of the underflow shifting constant (e.g., for 17 bit exponents 0x1007b) may depend on the number of bits used by the floating-point hardware unit 204 to represent floating-point exponents (e.g., 17) and/or the bias used by the floating-point standard (e.g., for 17 bit exponents 0x0ffff). In addition, the process 300 causes the CPU 104 to remove the bias (e.g., for 17 bit exponents subtract 0x0ffff) (block 320). Finally, the CPU 104 may use the corrected result in subsequent calculations (block 322). For example, the floating-point value with the 'true' exponent may be used by the floating-point software unit 208 in additional floating-point calculations, and/or the value may be scaled up based on the computational model being used (e.g., IEEE 754-1985 single precision, double precision, etc.).

In summary, persons of ordinary skill in the art will readily appreciate that methods and apparatus for determining a floating-point exponent associated with an underflow condition or an overflow condition have been provided. Systems implementing the teachings described herein may benefit from decreased hardware costs associated with an underflow bit and/or an overflow bit.

The foregoing description has been presented for the purposes of illustration and description. It is not intended to be exhaustive or to limit the invention to the examples disclosed. Many modifications and variations are possible in light of the above teachings. It is intended that the scope of the invention be limited not by this detailed description of examples, but rather by the claims appended hereto.

What is claimed is:

1. An apparatus structured to determine a floating-point exponent associated with an overflow condition, the apparatus comprising:

a floating-point hardware unit;

a processing unit operatively coupled to the floating-point hardware unit; and a memory device operatively coupled to the processing unit, the memory device storing a software program to be executed by the processing unit, the software program being structured to:

receive a truncated exponent from the floating-point hardware unit;

subtract an overflow shifting constant from the truncated exponent to produce a first result;

truncate the first result to a predetermined number of least significant bits to produce a second result;

add the overflow shifting constant to the second result to determine a third result; and overcome the overflow condition using the third result.

2. An apparatus as defined in claim 1, wherein the software program stored in the memory device is further structured to:

add an underflow shifting constant to the truncated exponent to produce the first result if an underflow condition occurred;

truncate the first result to the predetermined number of least significant bits to produce the second result if the underflow condition occurred; and subtract the underflow shifting constant from the second result if the underflow condition occurred.

3. An apparatus as defined in claim 1, wherein the software program stored in the memory device is structured to truncate the first result to a number of bits used by the floating-point hardware unit to represent exponents.

4. An apparatus as defined in claim 1, wherein the software program stored in the memory device is further structured to subtract a predetermined bias from the floating-point exponent.

5. An apparatus structured to determine a floating-point exponent associated with an underflow condition, the apparatus comprising:
   a floating-point hardware unit;
   a floating point software unit; and
   an exponent determination module, operatively coupled to the floating-point hardware unit and the floating-point software unit, the, exponent determination module being structured to:
      receive a truncated exponent from the floating-point hardware unit;
      add an underflow shifting constant to the truncated exponent to produce a first result;
      truncate the first result to a predetermined number of least significant bits to produce a second result;
      subtract the underflow shifting constant from the second result to produce the floating-point exponent;
      pass the floating-point exponent to the floating point software unit; and
      overcome the underflow condition using the floating-point exponent.

6. An apparatus as defined in claim 4, wherein the exponent determination module is further structured to:
   subtract an overflow shifting constant from the truncated exponent to produce the first result if an overflow condition occurred;
   truncate the first result to the predetermined number of least significant bits to produce the second result if the overflow condition occurred; and
   add the overflow shifting constant to the second result if the overflow condition occurred.

7. An apparatus as defined in claim 4, wherein the floating point software unit is structured to subtract a predetermined bias from the floating-point exponent.

8. A computer readable storage medium storing instructions structured to determine a floating-point exponent associated with an overflow condition, the instructions being structured to cause an apparatus to:
   receive a truncated exponent from a floating-point hardware unit;
   subtract an overflow shifting constant from the truncated exponent to produce a first result;
   truncate the first result to a predetermined number of least significant bits to produce a second result;
   add the overflow shifting constant to the second result to determine a third result; and
   overcome the overflow condition using the third result.

9. A computer readable storage medium as defined in claim 8, wherein the software program is further structured to cause the apparatus to:
   add an underflow shifting constant to the truncated exponent to produce the first result if an underflow condition occurred;
   truncate the first result to the predetermined number of least significant bits to produce the second result if the underflow condition occurred; and
   subtract the underflow shifting constant from the second result if the underflow condition occurred.

10. A computer readable storage medium as defined in claim 8, wherein the software program is further structured to cause the apparatus to truncate the first result to a number of bits used by the floating-point hardware unit to represent exponents.

11. A computer readable storage medium as defined in claim 8, wherein the software program is further structured to cause the apparatus to subtract a predetermined bias from the floating-point exponent.

12. A method of determining a floating-point exponent associated with an overflow condition, the method comprising:
   receiving a biased exponent from a hardware floating-point unit;
   subtracting a shifting constant from the biased exponent to produce a first result,
   truncating the first result to a predetermined number of least significant bits to produce a second result;
   adding the shifting constant to the second result to produce the floating-point exponent; and
   overcoming the overflow condition using the floating-point exponent.

13. A method as defined in claim 11 wherein subtracting the shifting constant from the biased exponent comprises subtracting 0x1007f from the biased exponent.

14. A method as defined in claim 11 wherein truncating the first result to the predetermined number of least significant bits comprises truncating the first result to a number of bits used by the floating-point unit to represent exponents.

15. A method as defined in claim 11 wherein truncating the first result to the predetermined number of least significant bits comprises truncating the first result to 17 least significant bits.

16. A method as defined in claim 11 wherein truncating the first result to the predetermined number of least significant bits comprises truncating the first result to one of 8, 11, and 15 least significant bits.

17. A method as defined in claim 11 wherein adding the shifting constant to the second result comprises adding 0x01007f to the second result.

18. A method as defined in claim 11 wherein receiving the biased exponent from the hardware floating-point unit comprises receiving data indicative of a number exclusively from 0x00000 to 0x0ffff inclusive and 0x01007f to 0x1ffff inclusive.

19. A method as defined in claim 11 further comprising subtracting a predetermined bias from the floating-point exponent.

20. A method as defined in claim 19 wherein a predetermined number of bits (N) are used by the floating-point unit to represent exponents and the predetermined bias is equal to $(2^N/2)-1$.

21. A method of determining a floating-point exponent associated with an underflow condition, the method comprising:
   receiving a biased exponent from a hardware floating-point unit;
   adding a shifting constant to the biased exponent to produce a first result,
   truncating the first result to a predetermined number of least significant bits to produce a second result;
   subtracting the shifting constant from the second result to produce the floating-point exponent; and
   overcoming the underflow condition using the floating-point exponent.

22. A method as defined in claim 20 wherein adding the shifting constant to the biased exponent comprises adding 0x01007b to the biased exponent.

23. A method as defined in claim 20 wherein truncating the first result to the predetermined number of least significant bits comprises truncating the first result to a number of bits used by the floating-point unit to represent exponents.

24. A method as defined in claim 20 wherein truncating the first result to the predetermined number of least significant bits comprises truncating the first result to 17 least significant bits.

25. A method as defined in claim 20 wherein truncating the first result to the predetermined number of least significant bits comprises truncating the first result to one of 8, 11, and 15 least significant bits.

26. A method as defined in claim 20 wherein subtracting the shifting constant from the second result comprises subtracting 0x01007b from the second result.

27. A method as defined in claim 20 wherein receiving the biased exponent from the hardware floating-point unit comprises receiving data indicative of a number exclusively from 0x00000 to 0x0ff85 inclusive and 0x0ff85 to 0x1ffff inclusive.

28. A method as defined in claim 20 further comprising subtracting a predetermined bias from the floating-point exponent.

29. A method as defined in claim 28 wherein a predetermined number of bits (N) are used by the floating-point unit to represent exponents and the predetermined bias is equal to $(2^N/2)-1$.

* * * * *

UNITED STATES PATENT AND TRADEMARK OFFICE
CERTIFICATE OF CORRECTION

PATENT NO.         : 7,272,623 B2                                Page 1 of 1
APPLICATION NO. : 10/118349
DATED              : September 18, 2007
INVENTOR(S)        : Marius A. Cornea-Hasegan It is certified that error appears in the above-identified patent and that said Letters Patent is hereby corrected as shown below:

Col. 8, line 39 after "0x" and before "1007f" delete "0".

Col. 10, line 2 after "0x0ff8" insert --0-- delete "5".

Signed and Sealed this

Twenty-seventh Day of November, 2007

JON W. DUDAS
*Director of the United States Patent and Trademark Office*